May 20, 1969 G. G. MERKL 3,445,740

STEP-BY-STEP THERMO-MAGNETIC MOTOR

Filed Feb. 20, 1968 Sheet 1 of 2

INVENTOR
GEORGE G. MERKL

BY James J. Cannon
ATTORNEY

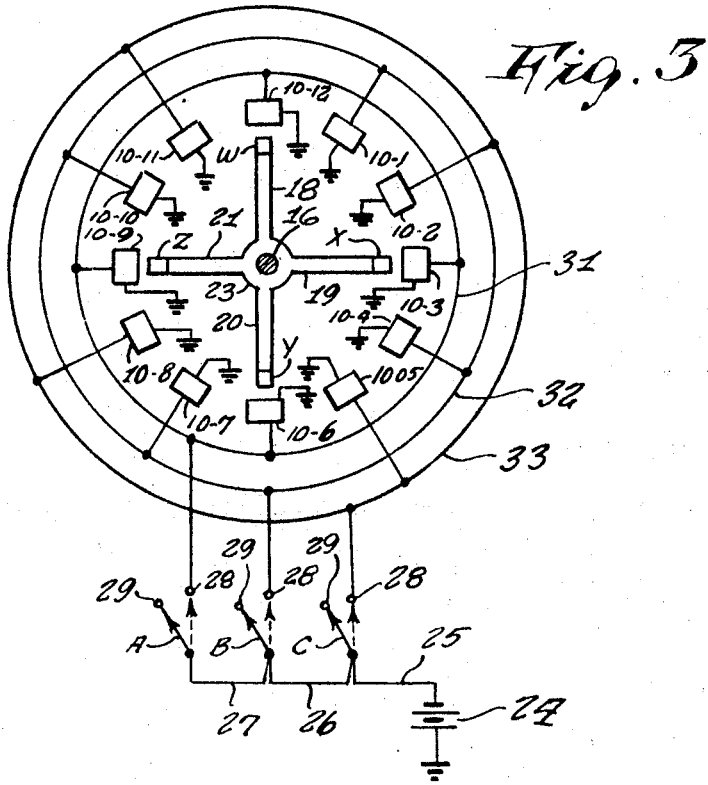

United States Patent Office 3,445,740
Patented May 20, 1969

3,445,740
STEP-BY-STEP THERMO-MAGNETIC MOTOR
George G. Merkl, 517 Boulevard,
New Milford, N.J. 07616
Filed Feb. 20, 1968, Ser. No. 706,832
Int. Cl. H02n 3/00
U.S. Cl. 318—117                              7 Claims

ABSTRACT OF THE DISCLOSURE

A step-by-step multi-position thermo-magnetic servomotor is shown, wherein the rotor comprises structure providing a group of salient poles. The salient poles may be produced by means such as permanent magnets. The salient poles are operatively associated with a cylindrically arranged group of magnetizable stator members each formed of an alloy the magnetic permeability of which becomes decreased upon heating. Normally, and with all of the stator members at room temperature, the rotor stands with each of its poles registering individually with one of the stator members. Each registering stator member is flanked by two inactive stator members. By simultaneously heating all of the registering stator members, the rotor becomes unlocked and free to move in either direction. By simultaneously heating, as a group, all of the inactive flanking stator members adjacent to the registering members at the same side of the registering members, the attraction of the rotor members to the two flanking stator members at either side of the registering members becomes unbalanced and the rotor is urged to move into register with the unheated group of flanking members.

---

The present invention relates to a slow-acting, thermomagnetic step-by-step motor or servomotor.

The motor comprises a stator structure consisting of a cylindrically arranged series of individually magnetizable stator members. A rotor member, revoluble coaxially with respect to the series of stator members, comprises at least one salient pole which, at ambient temperature, is normally in registering position with one of the stator members, being held in register by induced magnetism. Each registering stator member is flanked by two temporarily inactive stator members.

Displacement of the rotor is obtained by heating of all of the registering stator members to unlock the rotor and simultaneously heating all of the flanking members located at one side of each registering member. The only stator members which retain their full permeabilities are the unheated flanking members each located at the other side of one of the registering members. Accordingly, the rotor turns through an angular displacement such that the unheated flanking members become the new registering members. The magnitude of the angular displacement is determined by the angular spacing between the centers of adjacent stator members. After the heated stator members have been permitted to cool, the motor is ready for a new angular displacement of the rotor in ether direction of rotation.

The salient pole or poles of the rotor member may be produced conveniently by permanent magnets. If desired, however, electromagnets may be used.

The stator members are preferably formed of a nickel-iron alloy of which the magnetic permeability, and hence the induced magnetism, decreases in response to an increase in temperature. Other means for varying the magnetic pull between the rotor poles and the stator members will be similarly effective.

Control means are provided for selectively heating the stator members. The temperatures of the stator members may be increased individually by the use of a heated fluid such as a vapor or a hot liquid, thus avoiding the need for any electrically energy. When a fluid is used, its flow is controlled by suitable valve arrangements, each stator member comprising suitable passages to receive the fluid.

The invention is hereinafter described in greater detail in the following specification with reference to the accompanying drawing forming a part hereof.

In the drawing:

FIGURE 3 is a diagrammatic view including a group control system for an electrically heated embodiment of the device of FIGS. 1 and 2; and FIGURE 4 is a control diagram illustrating the pattern for operation of the individual heating devices in order to obtain various angular displacements of the rotor.

Figure 1:
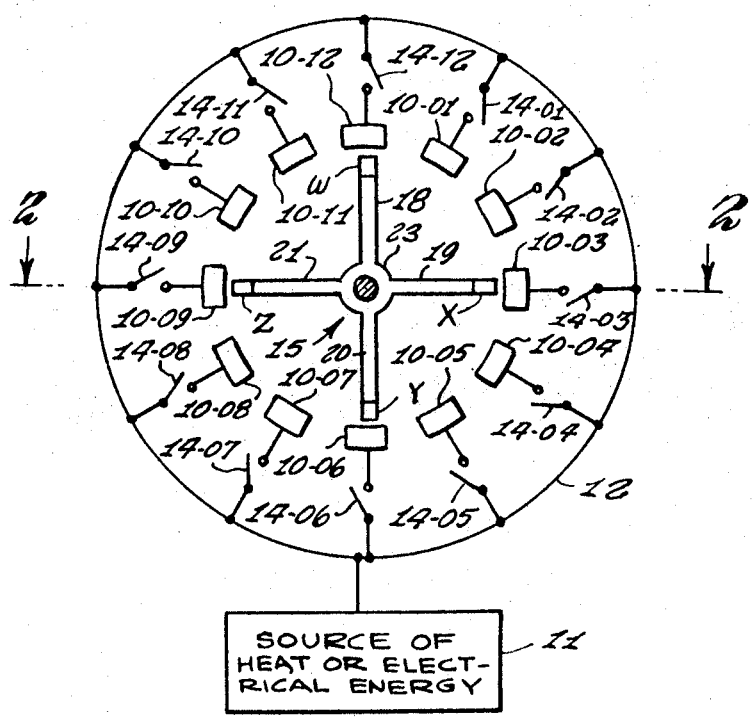
FIGURE 1 is a highly diagrammatic elevational end view of an embodiment of the invention.
Figure 2:
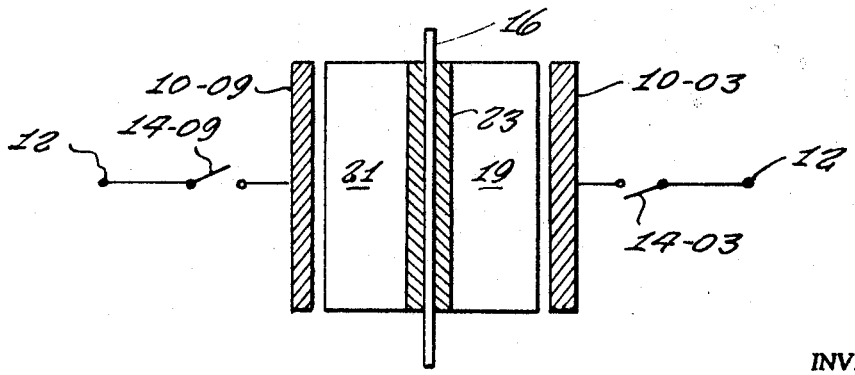
FIGURE 2 is a plan sectional view taken on the line 2—2 of FIG. 1.

Referring to FIG. 1, the motor comprises a generally cylindrically arranged series of twelve bar-like stator members designated 10-01 through 10-12. The stator bars 10-01 through 10-12 are formed of a nickel-iron alloy containing approximately 29%–30% nickel by weight, the balance consisting essentially of iron. Typical temperature-permeability characteristics of such a material are as follows.

| Temperature, ° C. | Flux, density/cm.² | Permeability |
|---|---|---|
| −20 | 5,360 | 116.3 |
| +25 | 2,750 | 59.8 |
| +50 | 780 | 17.0 |

Heat or electrical energy is supplied to the stator bars 10-01 through 10-12 from a common source 11 and a distribution connection 12. The supply of heat or electrical energy to each of the bars 10-01 through 10-12 is separately controlled by individual control members 14-01 through 14-12, respectively, all of which are connected to the source 11 through the common distribution connection 12. Upon closure of the control member 14-01, for example, the stator bar 10-01 becomes heated and its permeability decreases accordingly.

The motor further comprises a rotor designated generally as 15 which is mounted for rotation coaxially with the stator members on a shaft 16 journaled in suitable bearings (not shown). The rotor 15 comprises four mutually perpendicular radially extending arms 18, 19, 20 and 21 each connected to a central hub member 23. The rotor arms 18–21 are magnetized at their ends to provide four salient poles designated W, X, Y and Z, respectively. These salient poles are produced in conventional manner either by permanent magnets or by electrically energized magnet windings (not shown). The polarities of the poles W through Z are immaterial. This is because there is no appreciable permanent magnetism or bias for the stator members and each stator member is, therefore, insensitive to the polarity of the rotor pole upon which it is magnetically exerting an attractive force.

The operation of the device is as follows:

Assume, for example, that it is desired to advance the rotor clockwise through an angle of 30° which is the angular spacing between the centers of adjacent stator members when there are twelve such members, as shown in the drawing. The rotor 15 is indicated as being initially positioned with poles W, X, Y and Z registering with stator members 10-12, 10-03, 10-06 and 10-09, respectively. After it has been advanced clockwise through a 30° angular displacement, poles W, X, Y and Z will then register with stator members 10-01, 10-04, 10-07 and 10-10, respectively.

The desired 30° advance is obtained by simultaneously heating stator members 10–12, 10–03, 10–06 and 10–09 to reduce their permeabilities and thereby effectively unlock the registering poles W, X, Y and Z. The poles, even though unlocked, are still held by the balanced attractive forces of the four pairs of flanking stator members 10–11, 10–01; 10–02, 10–04; 10–05, 10–07; and 10–08, 10–10. In order to provide for a clockwise advance, the pull of the flanking members is unbalanced by simultaneously heating stator members 10–11, 10–02, 10–05 and 10–08. As a result of the reduction in the permeability of the heated stator members, the prevailing pull acting on the salient rotor poles W, X, Y and Z is exerted by the unheated flanking members 10–01, 10–04, 10–07 and 10–10. Accordingly, the rotor 15 is displaced clockwise through an angle of 30° and stator members 10–01, 10–04, 10–07 and 10–10 become the new registering members. After the heated rotor members have been permitted to cool, the rotor is ready for the next 30° displacement in either direction.

FIGURE 4 illustrates a pattern for heating the stator members in various combinations to obtain any desired 30° displacement of the rotor 15 in either direction. As previously stated, the heating of any stator member 10 is obtained by actuation of its associated control member 14 to raise its temperature. Any heated stator member 10 is permitted to cool by releasing or deactuating its associated individual control member 14.

To simplify manipulation of the control members, in accordance with the pattern of FIG. 4, the stator members 10 may be connected in groups for simultaneous heating as shown in FIG. 3. In FIG. 3, the individual control members 14–01 through 14–12 have been replaced by three master control members A, B and C. The common source of energy 11 is illustratively shown as a grounded battery 24 connected by distribution conductors 25, 26 and 27 to the master controls A, B and C. Each of the three separate master controls A, B and C is individually selectively movable between engagement with an active contact 28 and an inactive contact 29.

When master control A is in engagement with its active contact 28, it energizes stator members 10–12, 10–03, 10–06 and 10–09 simultaneously through a common connection 31. When master control B is in engagement with its active contact 28, it energizes stator members 10–01, 10–04, 10–07 and 10–10 through a common connection 32. Similarly, stator members 10–02, 10–05, 10–08 and 10–11 are simultaneously energizable through connection 33 by master control C. The pattern for actuation of the master controls A, B and C is shown in the first two columns of FIG. 4.

Each of the stator members 10 is provided with a resistive heating element (not shown) for converting the electrical energy of source 24 into heat. Suitable windings are to be employed if induction or high frequency heating of the stator members 10 is desired. In such case, of course, the grounded battery 24 is replaced by a suitable supply of alternating current energy. If steam or a hot liquid is used for heating, master controls A, B and C will be constituted by suitable valves. When using fluid heating, operation may be accelerated by using a coolant to reduce the temperatures of the heated stator members by directly induced active cooling instead of waiting for cooling by the ambient temperature.

While I have shown and described what I believe to be the best embodiment of my invention, it will be apparent to those skilled in the art that various changes and modifications may be made therein wtihout departing from the spirit and scope of the invention as defined in the appended claims.

What is claimed is:

1. A step-by-step thermo-magnetic motor comprising: a regularly arranged series of magnetizable stator members, the arrangement of said stator members being generally cylindrical; shaft means coaxial with said stator members; a rotor member carried by said shaft means for rotation coaxially with respect to said stator members; magnetic means included in said rotor member for producing a plurality of salient poles, said stator members being arranged in groups of three with the central member of each group registering with one of said poles when said stator member is stationary, both of the stator members flanking said registering member then being inactive; first control means for simultaneously reducing the magnetic attraction between said salient poles and all of said registering members; and second control means for simultaneously reducing the magnetic attraction between said salient poles and all of said flanking stator members at one side of said registering members while maintaining a magnetic attraction between said salient poles and the flanking members at the other side thereof, whereby said salient poles will advance into register with said last-named flanking members.

2. A motor according to claim 1, wherein each of said stator members is formed of a magnetizable material the permeability of which may be altered by changing the temperature thereof, and in which said first and said second control means each comprises controllable means for selectively and separately changing the temperatures of a predetermined group of said stator members.

3. A motor according to claim 1, wherein said magnetizable material is an iron-nickel alloy containing substantially 29%–30% nickel by weight, the balance consisting essentially of iron, and in which said first and said second control means are connected to reduce said magnetic attraction by causing an increase in the temperatures of those of said stator members which are exerting a magnetic attraction on said poles the magnitude of which is to be reduced.

4. A device of the class described, comprising: a motor according to claim 3, and a source of energy, said first and said second control means each being connected to said source of energy.

5. A device according to claim 4, in which said source of energy is a source of electrical energy, and wherein each of said stator members comprises electrical heating means for increasing its temperature, said first and said second control means each comprising electrical switching means for selectively connecting said heating means, in predetermined groups, to said source of energy.

6. A device according to claim 4, in which said source of energy is a source of heated fluid, and wherein each of said stator members comprises means to receive said fluid for increasing its temperature, said first and said second control means each comprising valve means for selectively connecting said receiving means, in predetermined groups, to said source of energy.

7. A motor according to claim 1, and embodying all of the improvements, both individually and in combination, which are herein shown and described.

References Cited

UNITED STATES PATENTS

| 396,121 | 1/1889 | Tesla | 310—4 |
| 1,764,518 | 7/1904 | Bremer | 310—4 |
| 1,756,800 | 4/1930 | Schwartz | 310—4 |
| 2,391,313 | 12/1945 | Hindle | 310—4 |

MILTON O. HIRSHFIELD, *Primary Examiner.*

D. F. DUGGAN, *Assistant Examiner.*

U.S. Cl. X.R.

310—4, 49